Oct. 29, 1946.    R. A. HINKLEY    2,410,345
PERFORATING AND TUBULATING APPARATUS
Filed Aug. 4, 1942    7 Sheets-Sheet 1

Inventor
RAY A. HINKLEY
By F. H. Knight
Attorney

Oct. 29, 1946.  R. A. HINKLEY  2,410,345
PERFORATING AND TUBULATING APPARATUS
Filed Aug. 4, 1942  7 Sheets-Sheet 2

Inventor
RAY A. HINKLEY
By [signature]
Attorney

Oct. 29, 1946.    R. A. HINKLEY    2,410,345
PERFORATING AND TUBULATING APPARATUS
Filed Aug. 4, 1942    7 Sheets-Sheet 4

Oct. 29, 1946.    R. A. HINKLEY    2,410,345
PERFORATING AND TUBULATING APPARATUS
Filed Aug. 4, 1942    7 Sheets-Sheet 7

Inventor
RAY A. HINKLEY
By
F. H. Knight
Attorney

Patented Oct. 29, 1946

2,410,345

UNITED STATES PATENT OFFICE 2,410,345

PERFORATING AND TUBULATING APPARATUS

Ray A. Hinkley, Corning, N. Y., assignor to Corning Glass Works, Corning, N. Y., a corporation of New York Application August 4, 1942, Serial No. 453,583

3 Claims. (Cl. 49—1)

The present invention relates to glass working apparatus and in particular to apparatus for perforating and tubulating glass articles. It has been the common practice in the past, while rotating an article, to heat a small area at the axial center of rotation and by means of a bait to draw out the heated area to form a perforation therein and then, while the article is being rotated, to seal a tube to the glass forming the boundary of a perforation so made. Although tubulation can be satisfactorily effected in this fashion considerable skill and time are required.

The prime object of the present invention is a machine which automatically performs the necessary perforating and tubulating operations.

The invention by way of example is illustrated in the form of a machine suitable for perforating and tubulating the upper bowl of a vacuum type coffee maker.

In the drawings

Fig. 8 is a sectional elevation through one of twelve similar ware chuck assemblies and apparatus with which the assembly is associated when at the perforating position of the machine;

Fig. 9 is a sectional elevation of one of twelve similar tube chuck assemblies which are arranged over the respective chuck assemblies of Fig. 8;

Fig. 9a is an enlarged view, partly in section, of the lower end of a tube chuck assembly;

Fig. 9b is a view taken on line 9b—9b of Fig. 9a;

Fig. 10 is a sectional plan view taken on line 10—10 of Fig. 9;

General description

Figures 11, 12, 13:
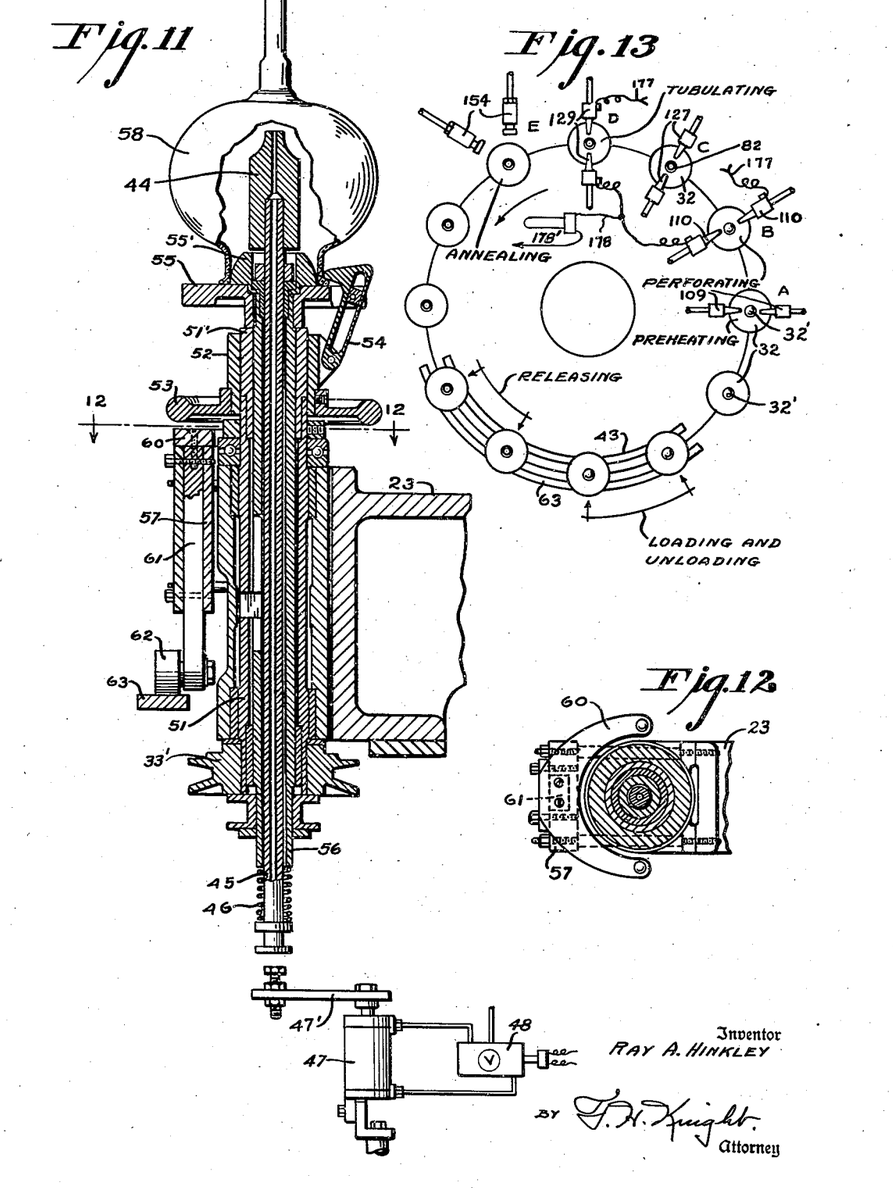
Fig. 11 is a view similar to that of Fig. 8 but of a modified form of assembly and taken at a position of the machine where reshaping of the passage between the ware body and tube occurs.
Fig. 12 is a sectional plan view taken on line 12—12 of Fig. 11.
Fig. 13 is a diagrammatic plan view illustrating the burner arrangement employed and identifying the various ware working positions.

The machine, in brief, comprises a pair of vertically aligned turrets 23 and 76 (Fig. 2) equipped with a plurality of vertically aligned sets of bowl and tube chucks successively indexed at various working positions (Fig. 13). Bowls are held in an inverted position with the tubes to be attached thereto arranged thereover. Each bowl after leaving a loading position in at least one indexed position is pre-heated to plasticity in the area it is to be perforated. In a subsequent position the plastic glass is pulled away from the bowl proper by a pulling unit 130 of a pulling mechanism (Figs. 1 and 3) which swings the pulling unit 130 into vertical alignment with the heated area of the bowl and then lowers the pulling unit into relatively close proximity to the heated wall area of the bowl. The pulling unit is then lowered into contact with the plastic glass and is immediately raised and, by suction carries with it the central wall portion of the plastic glass while attenuating the plastic glass connecting it to the remainder of the wall. While the pulling operation is taking place burners direct intense flames toward the attenuated glass and, assisted by a high frequency arc created between the burners, quickly effect complete severance between the withdrawn glass and the bowl proper to produce a perforation through the bowl wall. After severance the pulling mechanism swings the pulling unit to a cullet discharge position where the cullet is ejected therefrom. In a subsequent indexed position the tube, which is arranged over the aperture in the bowl, is lowered into contact with the bowl and fusion thereto is effected. Before the tubulated unit leaves this indexed position a bore shaping implement is, in certain modifications of the invention, projected from the interior of the bowl into its aperture to impart a desired shape to the bowl and tube bore where the bowl and tube are joined. As the tubulated bowl starts to move to its next indexed position the tube chuck is very slightly raised to effect a pulling of the seal between the bowl and tube. In the next one or more indexed positions annealing flames are directed onto the bowl and tube in the vicinity of the seal. On subsequent indexing movements the tube chuck is opened and raised clear of the tube so that the tubulated bowl is held solely by the bowl chuck before being indexed into loading and unloading positions. As the bowl enters these latter positions the bowl chuck is automatically opened to enable an attendant to readily remove the tubulated bowl therefrom and to replace it with another. The attendant at these same positions manually opens the tube chucks to reload them.

Basic units of the machine

Figures 6, 7:
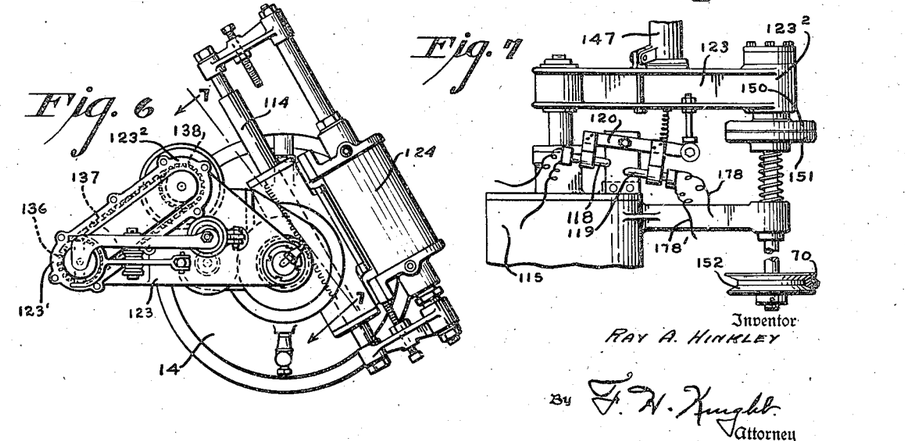
Fig. 6 is a plan view of Fig. 3.
Fig. 7 is a fragmentary view, in elevation, of the apparatus of Figs. 3 and 6 seen when looking in the general direction of arrows 7—7 applied to Fig. 6.

The machine proper is mounted on a carriage bed 11 (Figs. 1 and 2) and has mounted thereon a main base 12, a motor 13 for driving equipment carried by base 12, an auxiliary base 14 (Figs. 1, 3, and 6) supporting the pulling unit employed in perforating a glass article, and a timer unit 15 (Fig. 1) with an associated drive motor 16 for the control of indexing and other operations of the machine.

The base 12 (Fig. 2) supports a cylindrical casting 20 having a channel 21 at its upper end for receipt of a circular track 22 formed integral with the lower and outer edge of the hub of a turret 23. Attached to the lower inner edge of the hub of turret 23 is a drive drum 24 provided with twelve drive cones 25 adapted to be engaged in succession by a drive cam 26 driven by motor 13 to turn the turret 23 in step-by-step fashion.

Figures 8, 9, 9A, 9B, 10:
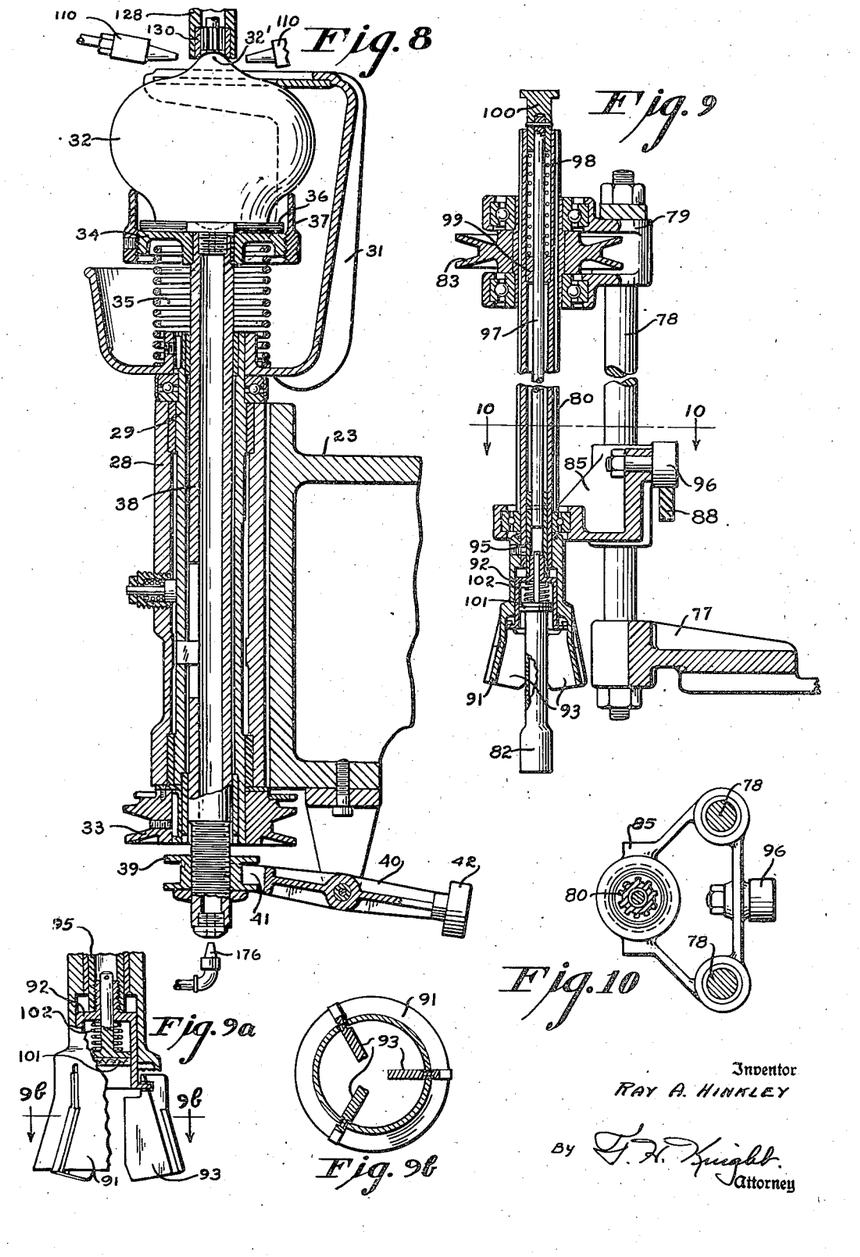

At equally spaced intervals about the rim of turret 23 (Figs. 2 and 8) are mounted suitably bushed housings 28 each of which supports the outer sleeve 29 of an article chuck assembly shown in detail in Fig. 8. Each sleeve 29 at its upper end carries a bowl cage 31 whose upper end serves as the fixed jaw of the chuck assembly. Sleeve 29 at its lower end carries a pulley 33 for rotating the chuck. The movable jaw of the chuck assembly comprises a platform 34 which rests on a spring 35 in turn resting on the lower inner surface of cage 31. Platform 34 is provided with a resilient cushion 36 to enable positive air pressure to be established within the bowl as will be brought out later and is also surrounded with a ware centering rim 37. With spring 35 substantially compressed a glass article such as a bowl 32 may be placed in cage 31 with the open end of the bowl resting on cushion 36 and within the confines of centering rim 37. When pressure on spring 35 is reduced sufficiently the article becomes clamped between platform 34 and the upper or fixed jaw portion of cage 31 under compression of spring 35. The extent of compression of spring 35 required for loading the chuck can be effected by manually exerting downward pressure on platform 34 as the ware is being placed in the chuck. However spring 35 may be compressed automatically as by tubular shaft 38 which passes through the bore of sleeve 29 with its upper end secured to platform 34 and, near its lower end, is equipped with a grooved collar 39. A lever 40, pivoted intermediate its ends, is provided at one end with a yoke 41 partly surrounding collar 39 and at the other end has a roller 42 co-operative with a cam track 43 (Figs. 2 and 13) to effect the compression of spring 35 as the chuck assembly 30 passes through the "loading and unloading" zone (Fig. 13). The shaft 38 serves the additional purpose of holding the platform properly centered and also serves as a conduit through which air may be supplied to the bowl 32 to establish positive air pressure therein for a purpose explained hereinafter.

The alternative form of chuck assembly shown in Fig. 11, comprises a tubular shaft 51 with an extension 51' at its top end surrounded by a vertically movable sleeve 52 equipped with a hand wheel 53 and having a plurality of chuck jaws 54 pivoted thereto. Shaft 51 at its lower end carries a pulley 33' for rotating the chuck. The ware seizing ends of jaws 54 pass through slots in the periphery of a platform 55 which rests on extension 51' and is secured to the upper end of a tubular shaft 56 and passes down through the bore of shaft 51. Jaws 54 are normally held by gravity in gripping relation with the rim of a bowl 58, placed upon platform 55. Bowl 58 is properly centered on platform 55 by a centering element 55' secured thereto. The chuck jaw carrying sleeve 52 may be manually lifted by means of hand wheel 53 to open the chuck assembly. A wheel lifting yoke 60 (Figs. 11 and 12) is, however, arranged immediately below wheel 53 and is provided with a depending arm 61 vertically movable in a guide assembly 57. Arm 61 at its lower end is equipped with a roller 62 co-operative with a cam track 63 to automatically lift wheel 53 to open the chuck during its travel through the "unloading and loading" zone. The chuck assembly of Fig. 11 is also equipped with a bore reshaping implement 44 attached to the upper end of a tubular shaft 45 passing through the bore of shaft 56. The lower end of shaft 45 is surrounded by a spring 46 compressed to assist gravity in restoring the implement 44 to the position shown after having been raised to perform a shaping operation. The raising of shaft 45 is effected immediately after a tubulating operation by arm 47' of a pneumatic unit 47 (Fig. 11) under control of a magnetic valve 48 as will be further described hereinafter.

Figures 16, 17, 18:
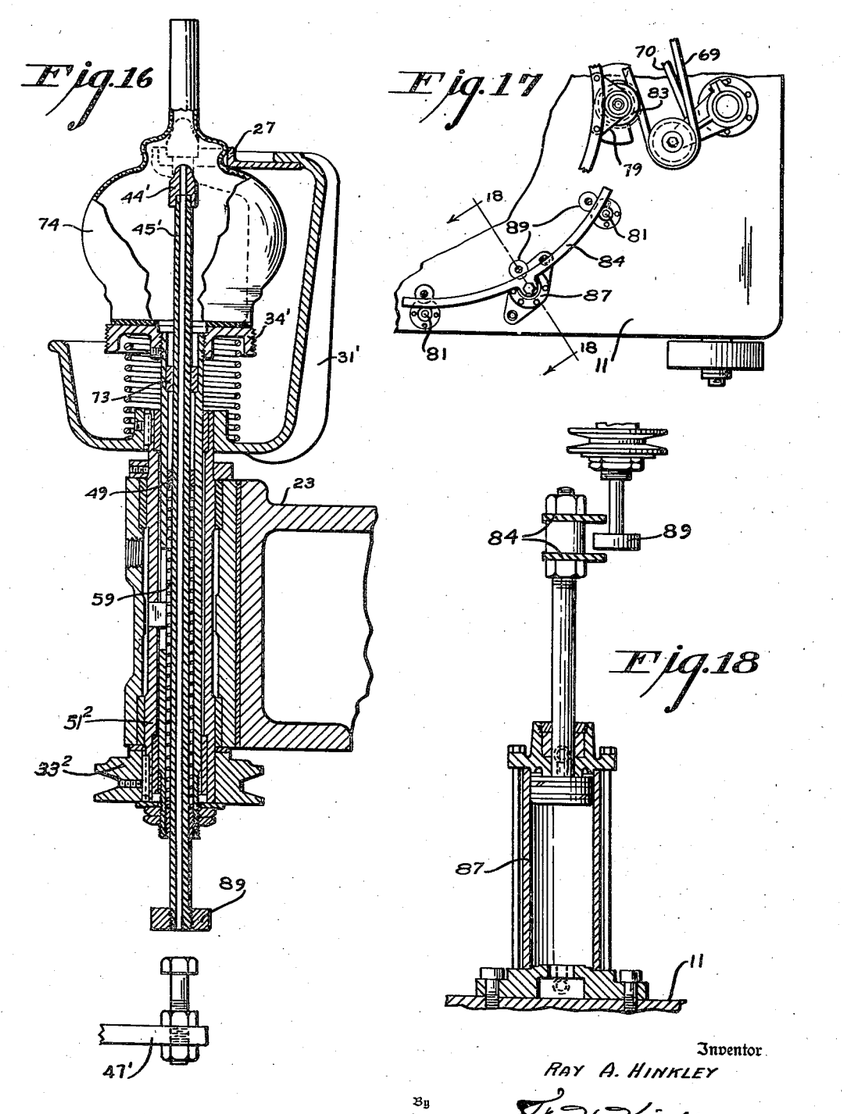
Fig. 16 is a view similar to that of Fig. 8 showing a further modified form of the assembly.
Fig. 17 is a plan view of a fragment of the base of the machine equipped with a movable track used in conjunction with the assembly of Fig. 16.
Fig. 18 is a sectional view on line 18—18 of Fig. 17.

The third form of bowl chuck assembly, shown in Fig. 16, is of the same general type as shown in Fig. 8, modified to enable the use of a reshaping implement 44' and to accommodate a different style bowl 74. The cage 31' is attached to the upper end of a tubular shaft 51² and has a yoke shaped jaw 27 which serves to accurately center bowl 74 on platform 34'. Shaft 51² at the lower end carries a pulley 33² for rotating the chuck. Implement 44' is carried on the upper end of a tubular shaft 45' normally supported in the position shown by means of a sleeve 49 secured to shaft 45' and resting upon a spring 59. The lower end of shaft 45' has threaded thereon a collar 89 adapted to be engaged and raised by the arm 47' (Fig. 11) to perform the shaping operation in the same manner as is implement 44 of the chuck assembly of Fig. 11. To enable loading of the chuck assembly of Fig. 16 a movable double rail track 84 (Figs. 17 and 18) is provided between the rails of which collar 89 travels while passing through the "loading and unloading" position and one of the adjacent positions. Track 84 is attached to suitable vertically movable guide posts 81 and is lowered by means of a pneumatic unit 87 under control of a valve 90 (Fig. 14) and a pilot valve 90' immediately after the machine has indexed to lower element 44' into the space immediately above a bushing 73 surrounding shaft 45', thereby enabling an attendant to readily remove a finished bowl 74 from the chuck or to load the same. Just before the machine indexes again the pneumatic unit 87, under control of valve 90 and a pilot valve 90², raises track 84 permitting the shaping element to again rise to the position shown while preventing the uncontrolled upward movement thereof by spring 59.

Tube chucks

Figure 1:
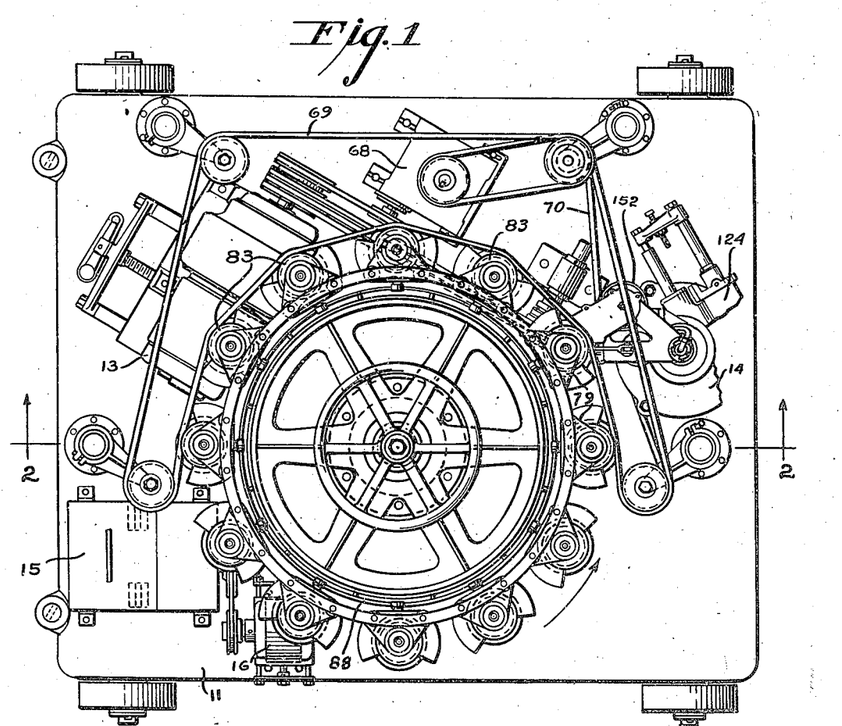
Fig. 1 is a plan view of the machine with certain parts broken away.
Figure 2:
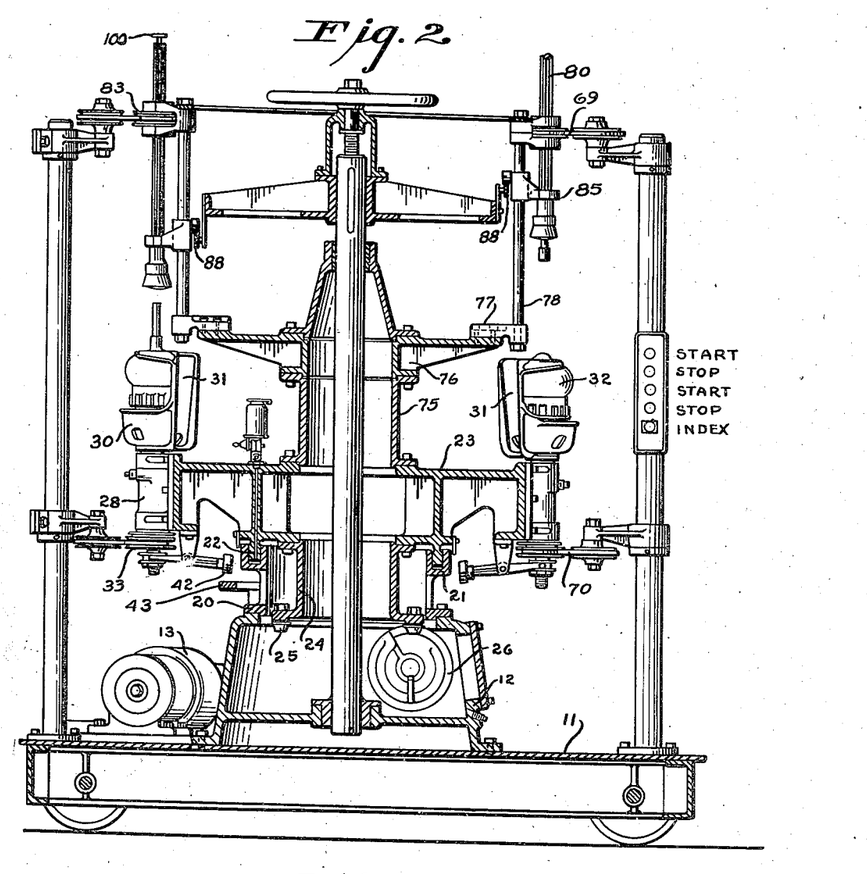
Fig. 2 is a sectional elevation taken on lines 2—2 of Fig. 1.

Attached to the upper surface of turret 23 (Fig. 2) is a spacer 75 which supports turret 76 having tube chuck assembly supports 77 attached to its rim (Figs. 1, 2, and 9). Each support 77 carries vertically disposed guide rods 78, the upper ends of which have rigidly secured thereto a bearing housing 79 rotatably supporting the splined tubular shaft 80 of a tube chuck assembly. The shaft 80 is splined in a pulley 83 by means of which it is rotated at times, as will be brought out later. Intermediate its ends shaft 80 is rotatably supported by a bracket 85 which is held in alignment by guide rods 78. Bracket 85 carries a roller 96 which travels on a track 88 (Figs. 1 and 19) to regulate the height of shaft 80 as required during its travel about the axial center of the machine. Attached to the lower end of shaft 80 is a chuck bell 91 having within it a chuck jaw carrier 92 from which a number of jaws 93 are loosely suspended within the bell which is slotted to provide guides which force the jaws to move toward one another as they are raised into the bell by carrier 92. The carrier 92 is attached to a tubular coupling member 95 which in turn is connected with an actuating rod 97 which extends upward through the splined shaft 80.

The chuck jaws 93 are normally held in position to resiliently hold a tube 82 when inserted therebetween by a spring 98 which surrounds the upper end of rod 97 and is held partly compressed between a bushing 99 and a rod actuating button 100. Provided within the chuck proper is a cushioned tube stop 101 held in its downward position by a spring 102. The stop 101 being resiliently held enables the jaws 93 to close about the tube 82 without sliding movement between the tube and the jaws, the spring being slightly more compressed instead. The jaws 93 are opened while in the "unloading and loading" zone when a fresh tube is to be inserted, by an attendant depressing button 100. A tube 82 attached to a bowl 32 is however released from the chuck jaws 93 by the depression of button 100 as it rides under a cam 94 (Fig. 19) while passing through the "releasing" zone, at which time the tube chuck is being raised clear of the tube. The tubulated bowl can accordingly be removed from the bowl chuck upon its entry into the "unloading and loading" zone. Of course, if the chuck assembly of Fig. 16 is being used the removal of the completed unit can only be effected between indexing movements of the machine.

Chuck drive

The motor 13 (Figs. 1 and 2) in addition to turning turret 23 about its axial center in step-by-step fashion, as already described, also drives a power take off unit 68 (Fig. 1) from which chuck drive belts 69 and 70 are continuously driven at a uniform speed. The belt 69 rides over tube chuck drive pulleys 83 as the chucks pass through a plurality of positions including positions A-E (Fig. 13), while belt 70 passes over pulleys 33 of the bowl chuck assemblies as they pass through positions A-E. Belt 70 also passes over a drive pulley 152 (Figs. 1 and 7) to impart a turning movement to pulling unit 130 (Figs. 3 and 4) as will be described hereinafter.

Heating equipment

In order to avoid unnecessary complication of the drawings the heating equipment has merely been diagrammatically illustrated in Fig. 13 as comprising pairs of burners 109, 127 and 154 and of pairs of burner-electrodes 110 and 129. The burners 109 at the position designated A are positioned to direct intense flames towards a bowl bulge 32'. Burner-electrodes 110 at position B direct intense flames toward the bulge 32' to sever it from the body of the bowl while the pulling unit is exerting a pull on the bulge as brought out hereinafter. At the same time a high frequency electric arc is established between burner-electrodes 110 to assist the flames in their severing function. Burners 127 at position C are set to direct flames toward the rim of the aperture formed by the removal of bulge 32' while the bowl was at position B. Burners at position C (not shown) but similar to burners 127 are preferably provided to heat the lower end of a tube 82 aligned over the bowl 32. The burner-electrodes 129 at position D, which are connected in multiple with burner-electrodes 110, apply heat both by flame and electric arc to effect fusion of the tube 82 to the bowl 32. Application of high frequency current between burner-electrodes 110 and between burner-electrodes 129 may be in accordance with methods taught in an article by E. M. Guyer entitled "High frequency electric glass welding," published in volume 79, 1941, of Transactions of the Electrochemical Society. The burners 154 are merely provided for annealing the seal.

Hole pulling mechanism

The base 14 (Figs. 1, 3, and 6) has an internal web 111 provided with a central hub 112 bushed to accommodate a tubular shaft 113 which is supported on hub 112 by a wide faced pinion 117 fixed to the shaft. Shaft 113 extends upward through bushed ends of a cylinder 115 and within the cylinder is provided with an operating piston 116 for raising and lowering shaft 113 of a pulling unit mechanism support 123 fixed to the upper end of shaft 113. A pair of mercury switches (Fig. 7) 118 and 119 are supported on a pivoted lever 120 which swings with the raising and lowering of shaft 113 to open and close switches 118 and 119. The purposes of these switches will be brought out later.

A pneumatic unit 124 is attached to the side of base 14 and has a piston actuated rack 114 in mesh with pinion 117 to effect swinging movements of support 123 to alternately position its free end 123' over an indexed bowl chuck and a cullet discharge station. Portion 123' comprises a bushed hub which accommodates a tubular shaft 128 (Fig. 4) which at its lower end is provided with the pulling unit or suction cup 130 and at its upper end with a grooved collar 131 which holds keys 139 in suitable slots in shaft 128 and in the hub of a surrounding sprocket wheel 136. A chain 137 (Fig. 6) passes around wheel 136 and a sprocket wheel 138 secured to the top end of a shaft (not shown) passing through a part 123² (Fig. 7) of support 123 and provided at its lower end with a friction drive disc 150 which engages and is driven by discs 151 when support 123 has the pulling unit 130 lowered over a bowl chuck assembly so that the unit 130 starts to rotate in unison with the bowl contained in the chuck before a pulling operation is initiated.

Collar 131 is partly surrounded by a yoke 148 (Fig. 3) on one end of a lever 149, pivoted intermediate its ends on support 123 while, at its opposite end, is coupled to an operating rod 161. Rod 161 is surrounded by a spring 162 under whose influence the rod actuates lever 149 to raise the pulling unit 130 when a pulling operation is to be performed. An associated pneumatic power unit 163 has a pusher member 164 which at times, as will be brought out later, forces the rod 161 upward against the tension of spring 162 to lower the pulling unit 130 into pulling relation, as illustrated in Fig. 8, with the bulge 32' of a bowl indexed at the perforating position (Fig. 8). At the proper time the operating member 164 is lowered to permit the pulling unit 130 to rise under the influence of spring 162 and carry with it bulge 32' which, as already explained, has been heated to a plastic condition by burners 109 and is being further subjected to heat from burner-electrode units 110 (Fig. 13) to effect severance of bulge 32' from the bowl proper. To prevent the softened glass of a bulge 32' from sagging out of range of the pulling unit 130 a stream of air is directed against the underside of the bulge concurrently with the connection of the vacuum line with the cup. The air is supplied from a line 174 (Fig. 5) through a line valve 175, a nozzle 176 (Figs. 5 and 8) and the bore of tubular shaft 38 (Fig. 8). The member 164 of power unit 163 in its up position holds a valve actuating member 175' in position to maintain valve 175 open, but allows the valve to close when member 164 is lowered to permit the pulling unit 130 to rise.

Figures 14, 15:
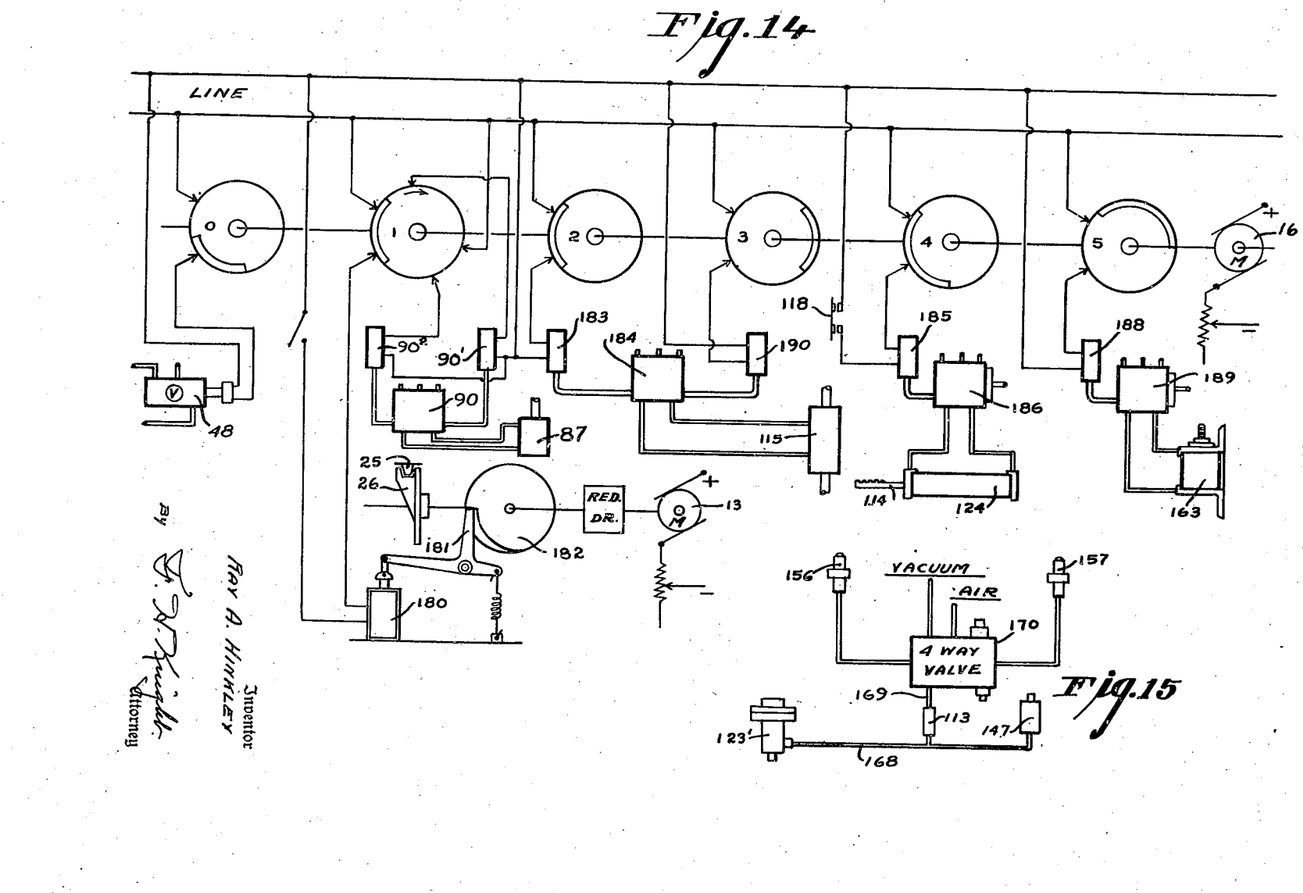
Fig. 14 is a diagrammatic view illustrating the timing circuits and pneumatic equipment directly controlled thereby.
Fig. 15 is a piping diagram of equipment indirectly controlled by the timing circuits.

A cullet knockout plunger 140 extends down into the bore of shaft 128 and at its lower end carries an externally grooved plug 140' extending nearly to the bottom of the interior of unit 130. Plunger 140 is held in its uppermost position against a knockout lever 145 by a spring 141 held partly compressed between a knockout button 142 and a bushing 143. The lever 145 is pivoted intermediate its ends and at the end remote from button 142 is attached to an operating rod 146 of a pneumatic unit 147. A conduit 168 is in communication with the pulling unit 130, pneumatic unit 147 and with the bore of shaft 113 at its upper end. A flexible tube 169 is attached to the lower end of shaft 113 and is arranged in communication with a four-way valve 170 (Fig. 15). Valve 170 under the influence of a bleeder valve 156 (Figs. 3 and 15) establishes communication between a vacuum line and tube 169 to enable the pulling unit 130 to seize softened glass 32' of a bowl while the unit is being raised by spring 162, and under the influence of a bleeder valve 157 establishes communication between an air supply line and tube 169 to pneumatically eject glass from element 130 and to actuate unit 147 to simultaneously drive plunger plug 140' out through the end of the element 130 to mechanically dislodge cullet therefrom. Operation of valves 156 and 157 is by means of a cam 173 attached to the lower end of shaft 113 and effective during swinging movements of support 123 in its raised position, as will be brought out hereinafter.

*Control and operation*

Figures 3, 4, 5:
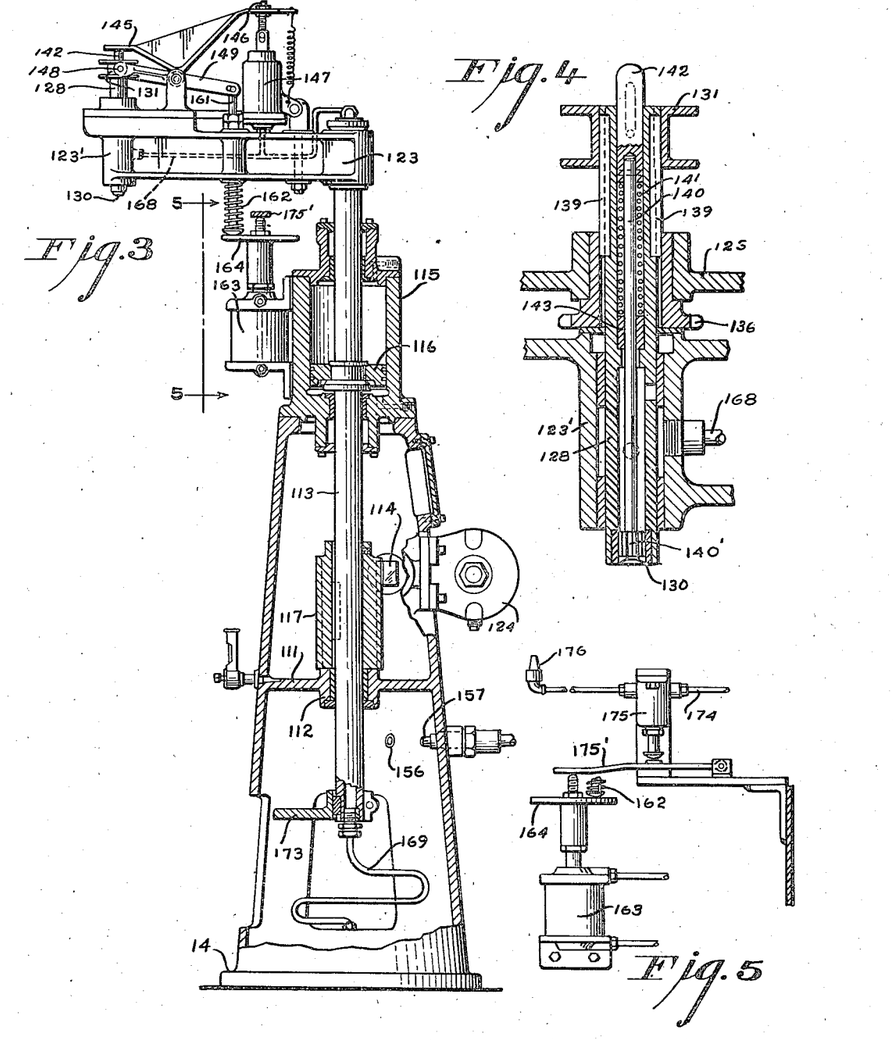
Fig. 3 is an elevational view, partly in section, of a pulling mechanism comprising a part of the perforating equipment of the machine.
Fig. 4 is an enlarged sectional elevation of a fragment of Fig. 3.
Fig. 5 is a view taken on line 5—5 of Fig. 3.

The indexing and other sequential operations of the machine are under control of the timer unit 15 (Fig. 1) diagrammatically shown in Fig. 14, which comprises equipment under control of cams 0 to 5 driven by motor 16. Before describing the control and operation, the characteristics of the valves employed will be briefly described. Pilot valves 156 and 157 are of a conventional type, each arranged to open and exhaust air from an end of valve 170 when actuated by cam 173. Pilot valves 90', 90², 183, 185, 188, and 199, and the pilot valve associated with control valve 48, are also similar to valves 156 and 157 but are magnetically opened. Each of the control valves 90, 170 and 184 is of the balanced piston type, such as shown in Figs. 3 and 4 of Goodrich Patent 2,267,236 issued December 23, 1941. In this type of valve air is constantly supplied to the respective ends of the cylinders through restricted passages so that as long as the bleeder valves remain closed the control valve pistons remain in the positions to which they have last moved. When the balance is temporarily destroyed by opening the bleeder valve associated with the opposite end of the cylinder, the piston shifts to such opposite end of the cylinder. In the special use made of valve 170 the cylinder and exhaust ports of one end of the valve are plugged, the vacuum line is connected to the remaining exhaust port and the tube 169 is connected with the remaining cylinder port. Each of the control valves 48, 186, and 189 is similar to the valve disclosed by the Goodrich patent differing only in that they are of the unbalanced type, so that control is entirely by one bleeder valve. In the unbalanced form of valve the effective diameter of one end of the cylinder is reduced and plugged so that the piston always remains shifted to the small end of the cylinder opposite that to which the bleeder valve is connected, except at such times that the associated bleeder valve is open. Cam 1 controls a circuit which includes a clutch release magnet 180, which is momentarily energized to move a stop 181 from a single tooth ratchet disc 182 of a single revolution clutch, enabling motor 13 through its reduction drive to rotate cam 26 one revolution to advance the chuck units one position.

Concurrently with an indexing operation, cam 2 completes an energizing circuit for a magnetic pilot valve 183 for a control valve 184 to cause such valve to supply air to cylinder 115 to raise the support 123 while cam 4 closes one break in the circuit for a magnetic pilot valve 185 whose circuit is completed by mercury switch 118 as soon as the pulling mechanism support 123 has reached its raised position. The energization of valve 185 causes an associated control valve 186 to cut off air normally supplied by it to the right hand end of unit 124 and to supply air to the left hand end thereof so that the rack 114 moves to swing the support 123 to carry the pulling unit 130 from the pulling position to a cullet discharge position. A short time later the circuit for valve 185 is again opened by cam 4 whereupon 186 is permitted to again supply air to the right hand end of unit 124 to return it to the pulling position. During the swinging movement toward the cullet discharge position, bleeder valve 156 is engaged by cam 173 (Fig. 3), but the valve 170 is already in the position in which it was placed by a previous actuation of valve 156, and accordingly the latter operation is without function. As the swinging movement is completed, however, cam 173 actuates bleeder valve 157 causing valve 170 to shift and substitute the air supply line for the vacuum line connection with tube 169. Air is accordingly supplied to the pneumatic knockout unit 147 to drive plug 140' out through the end of the gathering element 130 and at the same time to supply air to the bore of shaft 128 and out through unit 130 to positively eject the cullet therefrom. As the unit 130 approaches the pulling position cam 173 actuates bleeder valve 156 causing valve 170 to shift back and again substitute the vacuum supply line for the air supply line connections with tube 169. As the pulling unit support 123 returns the unit 130 to the pulling position cam 3 completes a circuit for a magnetic bleeder valve 190 causing valve 184 to shift and supply air to the unit 115 to lower support 123, thereby bringing clutch discs 150 and 151 into engagement to initiate the rotation of the pulling unit 130 before it is brought into contact with the rotating bowl 32. The foregoing operation is almost immediately followed by cam 5 closing the circuit for a magnetic pilot valve 188 which upon becoming energized causes an associated control valve 189, normally supplying air to the upper end of unit 163, to shift and supply air to the lower end of this unit. Unit 163 accordingly forces the pulling unit 130 into contact with the bulge 32', as illustrated in Fig. 8, until cam 5 again opens the circuit of magnetic valve 188 whereupon control valve 189 is again permitted to supply air to the upper end of the pulling cylinder 163 to lower pusher 164. Pusher 164 being lowered enables line valve 175 (Fig. 5) to close and cut off the air supply to the interior of the bowl and enables spring 162 to function to again raise the pulling cup 130, and with it the cap or bulge 32', it being remembered that the vacuum line is at this time in communication with unit 130. As bulge 32' is raised the glass in the circumferential region of the bulge is attenuated so that flames directed to this glass and a high frequency arc between burner-electrodes 110 readily completes the severance of bulge 32' from the main body of glass. Application of high frequency current to the burner-electrodes 110 to assist in separating the cap or bulge 32' from the bowl 32 proper is initiated by the closure of a circuit through mercury switch 119 which closes a break between conductors 178 and 178' to establish an electric potential between burner-electrodes 110 as support 123 is lowered preparatory to gathering, it being understood that leads 177 are connected with one terminal of the high frequency source and that conductor 178' is connected with the other terminal of such source.

Figure 19:
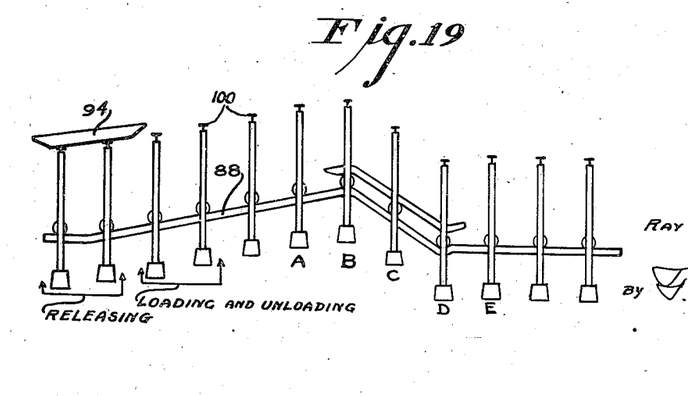
Fig. 19 is a diagrammatic development of all tube chucks of the assembly and their associated supporting and actuating cam tracks.

Referring now particularly to Figs. 13, 14, 15 and 19 a cycle of operation of the machine equipped with the chucks of Fig. 8 will be briefly followed through. A bowl 32 and a tube 82 are placed in a pair of chucks as they move through the "unloading and loading" zone. As the parts 82 and 32 are being advanced to the position designated A belts 69 and 70 are engaged by pulleys 83 and 33 to effect rotation of the parts and thus even heating of the parts is assured. Since belts 69 and 70 travel at the same speed parts 32 and 82 are rotated in unison as required particularly during the subsequent tubulating operation. While at position A burners 109 direct flames toward the bulge portion 32'. At position B, as will be evident from Fig. 19, the tube chuck has been raised well above the bowl chuck, providing ample clearance for allowing the pulling unit to swing into position over the bulge portion 32'. While the pulling unit 130 is being raised to pull bulge 32' from the bowl body proper burner-electrodes 110 assisted by the passage of high frequency current between them complete the separation of bulge 32' from the glass body proper. When the parts are indexed to position C burners 127 and others (not shown) act on the parts preparatory to the sealing of the parts to one another. At position D the parts have been brought into sealing relation and sealing is effected by means of heat supplied by flames from burner-electrodes 129 assisted by the passage of a high frequency current between them in multiple with that at the same time applied to burner-electrode units 110. Pulling of the seal takes place as the sealed unit at position D is leaving such position by providing a slight rise in track 88 at this position (Fig. 19). At position E the seal of the completed unit is subjected to annealing flames from burners 154. As a completed unit passes through the "releasing" zone cam track 94 engages button 100 and forces shaft 97 down and thus frees the tube of the unit from its chuck, allowing the chuck to be raised clear of the tube by cam track 88 as it enters the "loading and unloading" zone. As the latter zone is entered the bowl chuck is opened by the actuation of lever 40 under control of cam track 43. thereby enabling an attendant to remove a tubulated bowl from its chuck.

When chucks of the type shown in Fig. 11 are employed the operations of the machine are as already described except that just preceding an indexing movement cam 0 causes control valve 48 to momentarily shift and supply air to the lower end of pneumatic unit 47 (Fig. 11) instead of to the upper end thereof. As a result the implement 44 is momentarily raised to shape the passage at the junction of the bowl and tube.

When chucks of the type shown in Fig. 16 are used the operations are as above described with the exception that immediately after an indexing operation cam 1 momentarily energizes pilot valve 90' so that valve 90 will supply air to unit 87 to lower track 84 and thus enable removal of a completed unit at the "unloading and loading" position. Preceding the next indexing movement cam 1 energizes pilot valve 90² to restore valve 90 so that it again supplies air to unit 87 to raise track 84 to its original position.

While in the foregoing there has been shown and described the preferred embodiment of the invention, it is to be understood that minor changes in the details of construction, combination and arrangement of parts may be resorted to without departing from the spirit and scope of the invention as claimed.

What I claim is:

1. In a glass working apparatus, a chuck adapted to hold a glass article, means adjacent said chuck for heating to plasticity a restricted wall area of a glass article held by said chuck, a suction gathering unit adjacent said chuck, means operatively connected to said unit for moving it from a discharge position into juxtaposed relation to the plasticized wall area of the article and back to its discharge position, means adjacent said chuck for applying pressure to the plasticized wall area of the article in a direction towards said unit while said unit is moving toward the article, means operatively connected to said unit for establishing communication between it and a vacuum line and for maintaining the same during movement of said unit from such juxtaposed relation toward its discharge position to seize and draw plasticized glass away from the article proper, thermal means adjacent said chuck for severing the major portion of the seized glass from the article proper, and means operatively associated with said unit for ejecting the seized glass therefrom upon its arrival at the discharge position.

2. In a glass working apparatus, a chuck adapted to hold a glass article, means adjacent said chuck for heating to plasticity a restricted wall area of a glass article held by said chuck, a suction gathering unit adjacent said chuck, means operatively connected to said unit for moving it from a discharge position into juxtaposed relation to the plasticized wall area of the article and back to its discharge position, means operatively connected to said unit for establishing communication between it and a vacuum line and for maintaining the same during movement of said unit from such juxtaposed relation toward its discharge position to seize and draw plasticized glass away from the article proper, thermal means adjacent said chuck for severing the major portion of the seized glass from the article proper, and means operatively associated with said unit for ejecting the seized glass therefrom upon its arrival at the discharge position.

3. In combination, a movable carrier, a plurality of vertically aligned tube and container holders supported by said carrier, means operatively connected to said carrier for indexing it to successively bring a tube and container in said holders to different fabricating positions, means operatively associated with a container holder at the first of such positions for heating a restricted wall portion of the container, means operatively associated with a container holder at a subsequent indexed position for also applying heat to said wall portion, means including a suction gathering device adjacent the latter position for removing the heated wall portion of the container to produce an aperture therethrough, means operatively associated with one of the holders for moving it to bring the wall portion of a container comprising the boundary of the aperture and an end wall of a tube aligned therewith into contactual relation as they are being indexed to a subsequent one of said positions, heat applying means operatively associated with the holders when at the latter of said positions for completing a seal between a tube and container, means operatively associated with each container holder and mounted for movement into the aperture of said container for giving a predetermined shape characteristic to the inner surfaces of the container and tube in their region of juncture, and an actuator for said last means at the position at which a tube and container are brought into contactual relation.

RAY A. HINKLEY.